United States Patent
Utsunomiya et al.

(10) Patent No.: US 7,664,042 B2
(45) Date of Patent: Feb. 16, 2010

(54) STORAGE CONTROL APPARATUS, STORAGE APPARATUS, STORAGE CONTROL METHOD, AND COMPUTER-READABLE RECORDING MEDIUM FOR EXECUTING A COMMAND BASED ON DATA IN RECEIVED PACKET

(75) Inventors: Shini-chi Utsunomiya, Kawasaki (JP); Katsuhiko Takeuchi, Kawasaki (JP); Nobuyuki Myouga, Kawasaki (JP); Sumie Matsubayashi, Kawasaki (JP); Hirohide Sugahara, Kawasaki (JP);

(73) Assignee: Toshiba Storage Device Corporation, Tokyo (JP)

(*) Notice: Subject to any disclaimer, the term of this patent is extended or adjusted under 35 U.S.C. 154(b) by 1070 days.

(21) Appl. No.: 10/779,401

(22) Filed: Feb. 13, 2004

(65) Prior Publication Data

US 2005/0058079 A1    Mar. 17, 2005

(30) Foreign Application Priority Data

Sep. 17, 2003    (JP)    ............................. 2003-324649

(51) Int. Cl.
 H04L 12/26    (2006.01)
 H04L 12/50    (2006.01)
 H04L 12/56    (2006.01)

(52) U.S. Cl. .................. 370/242; 370/381; 370/394

(58) Field of Classification Search ................. 370/242, 370/381–383, 392, 394
See application file for complete search history.

(56) References Cited

U.S. PATENT DOCUMENTS

| 5,255,268 | A |   | 10/1993 | Cato et al. |
| 5,530,703 | A | * | 6/1996 | Liu et al. .................... 370/255 |
| 5,802,320 | A |   | 9/1998 | Baehr et al. |
| 7,003,710 | B2 | * | 2/2006 | Tomaru et al. .............. 714/751 |
| 7,027,394 | B2 | * | 4/2006 | Gupta et al. ............. 370/230.1 |
| 2002/0041570 | A1 | * | 4/2002 | Ptasinski et al. ............ 370/252 |
| 2003/0131125 | A1 | * | 7/2003 | Ooi ........................... 709/237 |
| 2003/0161327 | A1 | * | 8/2003 | Vlodavsky et al. ..... 370/395.52 |
| 2004/0083309 | A1 |   | 4/2004 | Yamamoto |

(Continued)

FOREIGN PATENT DOCUMENTS

JP    02-501791 A    6/1990

(Continued)

OTHER PUBLICATIONS

APT Technologies, Inc., Dell Computer Corporation, Intel Corporation, Maxtor Corporation, Seagate Technology, Serial ATA, "High Speed Serialized AT Attachment", http://www.serialata.org/collaterial/index.shtml.

(Continued)

Primary Examiner—Hong Cho
(74) Attorney, Agent, or Firm—Greer, Burns & Crain, Ltd.

(57) ABSTRACT

Information about an attribute of packets that are receivable corresponding to a command is registered. When a packet is received, information about an attribute of the packet received is acquired. Upon occurrence of a reception error that there is no information in the attribute registering unit corresponding to the information acquired by the attribute acquiring unit, a predetermined reception error handling routine is executed according to a type of the reception error.

20 Claims, 8 Drawing Sheets

U.S. PATENT DOCUMENTS

2006/0168371 A1 * 7/2006 Chiu .................... 710/62

FOREIGN PATENT DOCUMENTS

| JP | 02-501792 A | 6/1990 |
|----|----|----|
| JP | 05-336126 A | 12/1993 |
| JP | 09-224053 A | 8/1997 |
| JP | 11-275149 | 10/1999 |
| JP | 2001-203752 | 7/2001 |
| JP | 2002-344539 A | 11/2002 |
| WO | WO-89/03562 | 4/1989 |
| WO | WO-89/03563 | 4/1989 |
| WO | WO-02/027519 | 4/2002 |

OTHER PUBLICATIONS

"Japanese Office Action", English Translation, Mailed Apr. 7, 2009, in regards to JP App. No. 2003-324649.

* cited by examiner

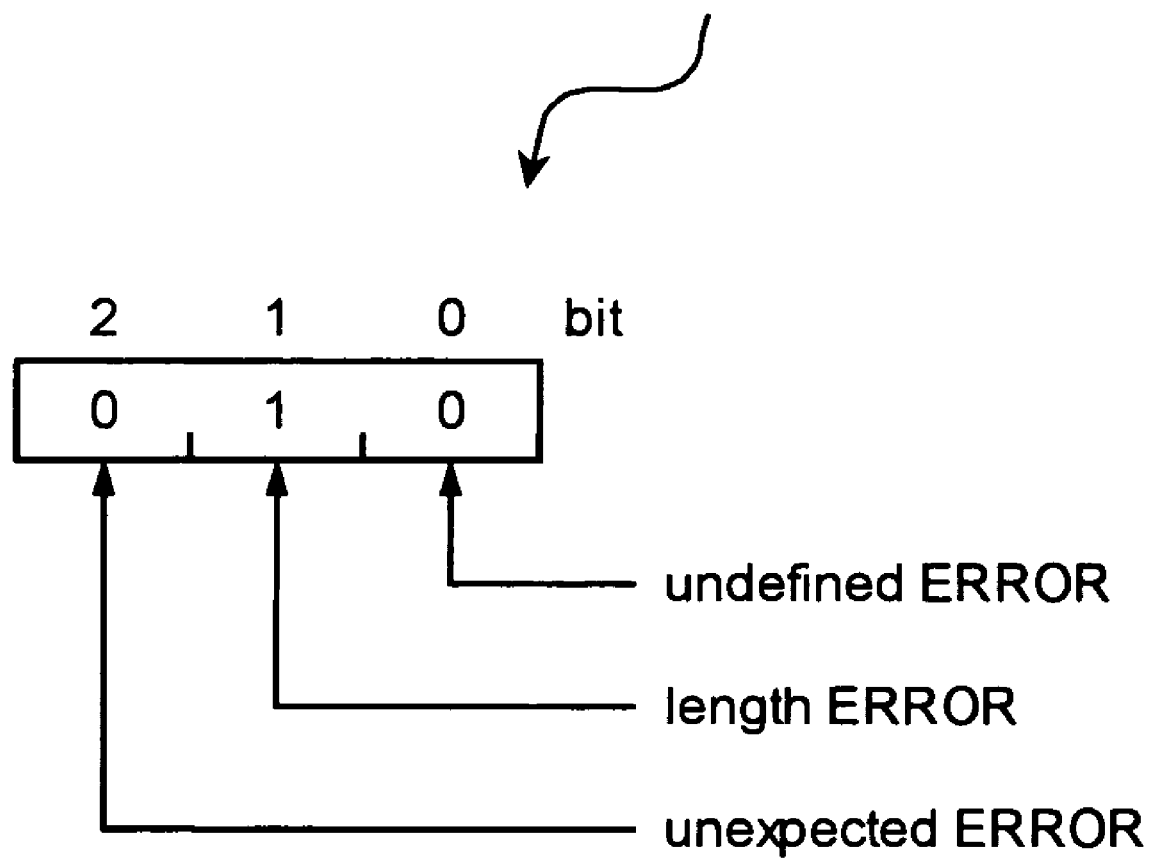

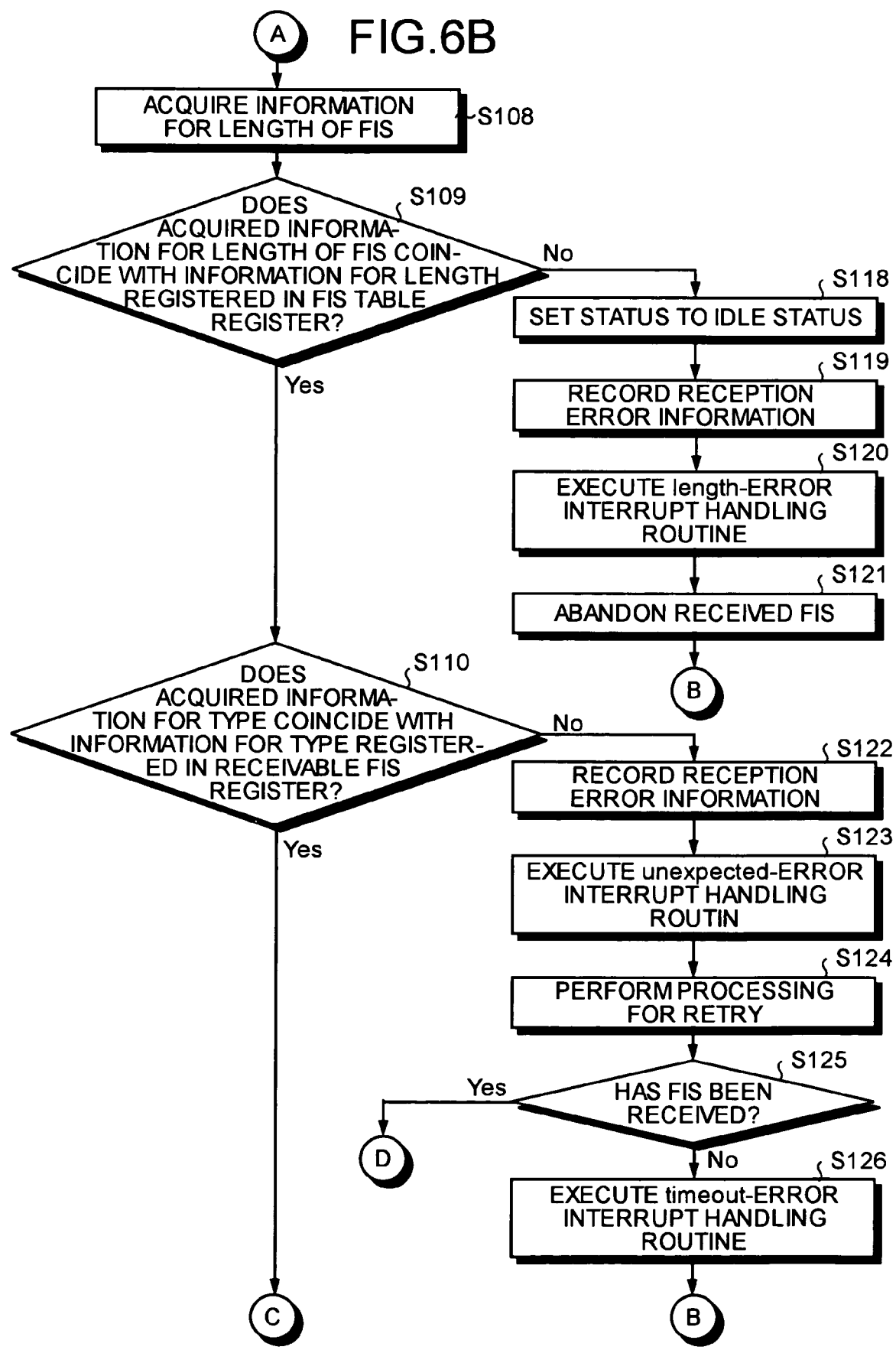

STORAGE CONTROL APPARATUS, STORAGE APPARATUS, STORAGE CONTROL METHOD, AND COMPUTER-READABLE RECORDING MEDIUM FOR EXECUTING A COMMAND BASED ON DATA IN RECEIVED PACKET

BACKGROUND OF THE INVENTION

1) Field of the Invention

The present invention relates to a technology for receiving a packet including data required to execute a predetermined command and executing the command.

2) Description of the Related Art

Serial advanced technology (AT) attachment (serial ATA) is coming into wide use as a storage interface standard for storage devices such as hard disk drives. In the serial ATA, when a hard disk drive is to execute a command issued from a host computer, the host computer and the hard disk drive perform data transmission/reception using packets referred to as frame information structure (FIS).

If an error occurs in the packet transmitted/received between the host computer and the hard disk drive, a retry is performed until transmission/reception of packets is complete without occurrence of an error as described in APT Technologies, Inc., Dell Computer Corporation, Intel Corporation, Maxtor Corporation, Seagate Technology, Serial ATA: High Speed Serialized AT Attachment, Revision 1. Oa, 7 Jan. 2003, 11.4 Transport error handling overview, pp. 276-279, [online] [retrieved on 2 Sep. 2003].

However, in the technology disclosed in the above-mentioned literature, the processing for the retry is executed irrespective of types of errors. Therefore, an error handling routine is stacked caused by the execution of the retry to make the error handling routine delayed in its execution.

In other words, even when receiving FIS having nothing to do with a command that is to be executed, the hard disk drive requests again transmission of a packet until the error is restored. Therefore, the error handling routine cannot quickly be executed.

SUMMARY OF THE INVENTION

It is an object of the present invention to solve at least the problems in the conventional technology.

A storage control apparatus according to one aspect of the present invention receives a packet including data required to execute a predetermined command and that executes the command based on the data in the packet received. The storage control apparatus includes an attribute registering unit to register information about an attribute of packets that are receivable corresponding to a command; an attribute acquiring unit that acquires information about an attribute of the packet received; and a reception error handling unit that, upon occurrence of a reception error that there is no information in the attribute registering unit corresponding to the information acquired by the attribute acquiring unit, executes a predetermined reception error handling routine according to a type of the reception error.

A storage apparatus according to another aspect of the present invention receives a packet including data required to execute a predetermined command and that executes the command based on the data in the packet received. The storage apparatus includes an attribute registering unit to register information about an attribute of packets that are receivable corresponding to a command; an attribute acquiring unit that acquires information about an attribute of the packet received; and a reception error handling unit that, upon occurrence of a reception error that there is no information in the attribute registering unit corresponding to the information acquired by the attribute acquiring unit, executes a predetermined reception error handling routine according to a type of the reception error.

A method of receiving a packet including data required to execute a predetermined command and executing the command based on the data in the packet received, according to still another aspect of the present invention, includes registering information about an attribute of packets that are receivable corresponding to a command; acquiring information about an attribute of the packet received; and executing, upon occurrence of a reception error that there is no information in the attribute registering unit corresponding to the information acquired by the attribute acquiring unit, a predetermined reception error handling routine according to a type of the reception error.

A computer program according to still another aspect of the present invention realizes the method according to the above aspect on a computer.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 5 is a diagram of an example of reception error information to be registered in an interrupt register; and FIGS. 6A to 6C are flowcharts of a procedure for receiving FIS performed by the hard disk control unit.

DETAILED DESCRIPTION

Exemplary embodiments of a storage control apparatus, a storage apparatus, a storage control method, and a computer program according to the present invention are explained in detail below with reference to the accompanying drawings. As an example of the storage control apparatus, a case of applying the present invention to a hard disk control unit according to the serial AT attachment (serial ATA) standard is explained below. Data transmission/reception is performed between a host computer and the hard disk control unit using a packet referred to as frame information structure (FIS) based on the serial ATA standard.

The configuration of the hard disk control unit according to an embodiment of the present invention is explained below. Various commands are transmitted from the host computer to the hard disk control unit. However, since attributes of FIS received by the hard disk control unit, that is, a type and a length of FIS and a receiving order of FISs are determined by commands, the attributes can be predicted.

Therefore, a controller that controls the hard disk control unit previously registers information for attributes of FIS that is receivable correspondingly to a command transmitted from the host computer, acquires information for attributes of received FIS, and determines whether the acquired information corresponds to the registered information.

If a reception error occurs in such a manner that the acquired information does not correspond to the registered information, the controller executes a predetermined reception error handling routine according to the type of reception error.

More specifically, the controller discriminates a reception error that needs a retry for requiring retransmission of FIS from a reception error that does not need the retry or from a reception error determined that an expected FIS is not transmitted even if the retry is performed. The controller performs the retry only when the reception error needs it.

Accordingly, the controller does not always perform the retry each time a reception error occurs, but determines whether a reception error requires the retry based on its type, and performs an appropriate reception error handling routine. Therefore, the error handling routine related to reception of a packet for FIS can be performed speedily and efficiently.

Figure 1:
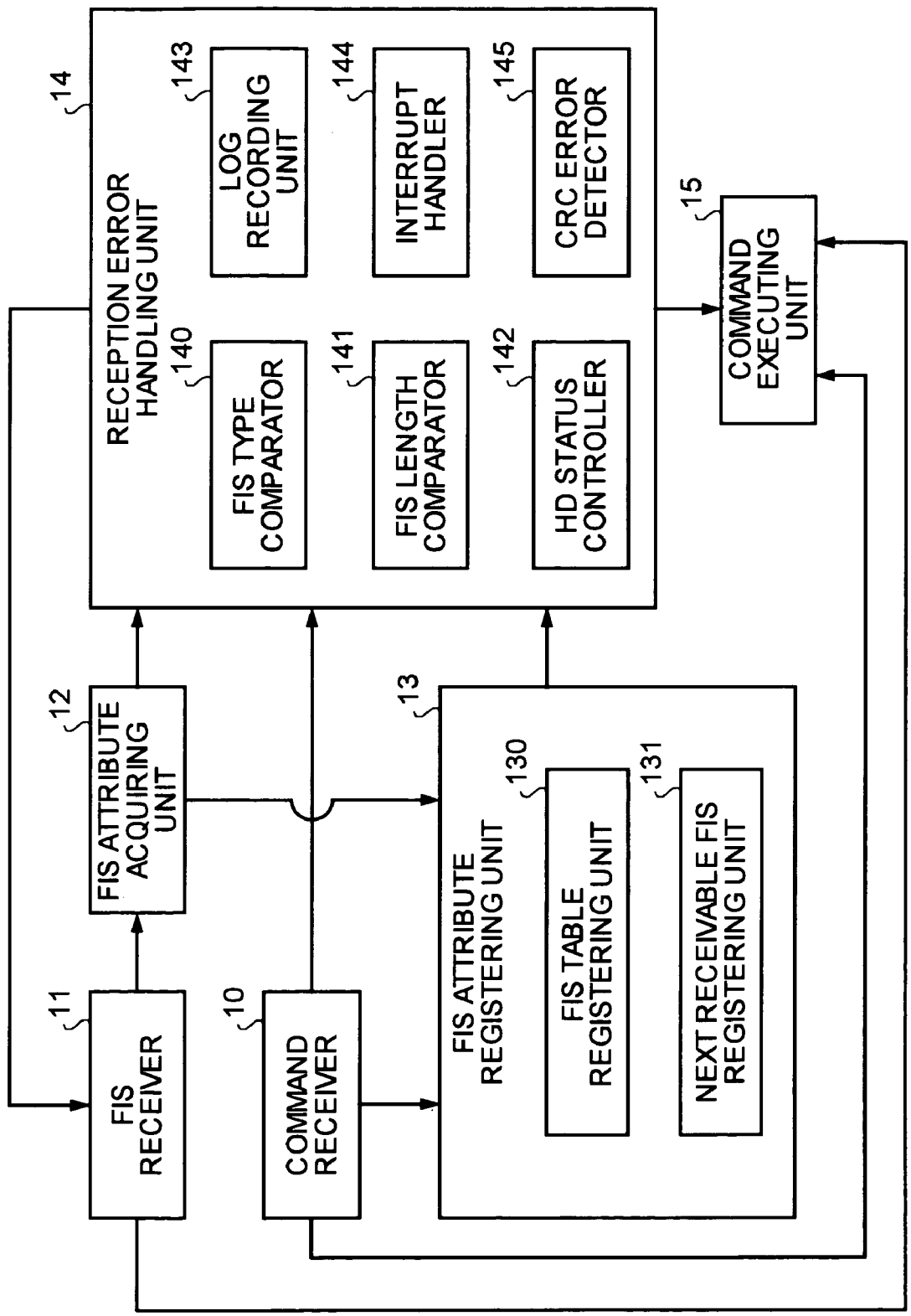
FIG. 1 is a functional block diagram of a configuration of a hard disk control unit according to an embodiment of the present invention.

FIG. 1 is a functional block diagram of the configuration of the hard disk control unit according to an embodiment of the present invention. The controller of the hard disk control unit includes a command receiver 10, a FIS receiver 11, a FIS attribute acquiring unit 12, a FIS attribute registering unit 13, a reception error handling unit 14, and a command executing unit 15.

An attribute acquiring unit described in claims corresponds to the FIS attribute acquiring unit 12, an attribute registering unit described in the claims corresponds to the FIS attribute registering unit 13, and a reception error handling unit described in the claims corresponds to the reception error handling unit 14.

The command receiver 10 receives a command to be executed by the controller from the host computer, and stores the command in a command register (not shown) of the command receiver 10. The FIS receiver 11 receives a FIS packet from the host computer. The FIS receiver 11 decodes the received FIS and stores the decoded FIS in a receive First-in First-out (RFIFO) memory (not shown) of the FIS receiver 11.

The FIS attribute acquiring unit 12 acquires information for the type of FIS received by the FIS receiver 11 from the header of the FIS, and acquires information for a length of the FIS by counting the number of bits from the header to the last bit of the FIS.

The FIS attribute registering unit 13 registers information for an attribute of FIS which is receivable correspondingly to the command received by the command receiver 10. The FIS attribute registering unit 13 includes a FIS table registering unit 130 and a next receivable FIS registering unit 131.

The FIS table registering unit 130 registers information for a type and a length of FIS in a FIS table register (not shown) of the FIS table registering unit 130, the FIS being receivable correspondingly to a command received by the command receiver 10.

Figure 2:
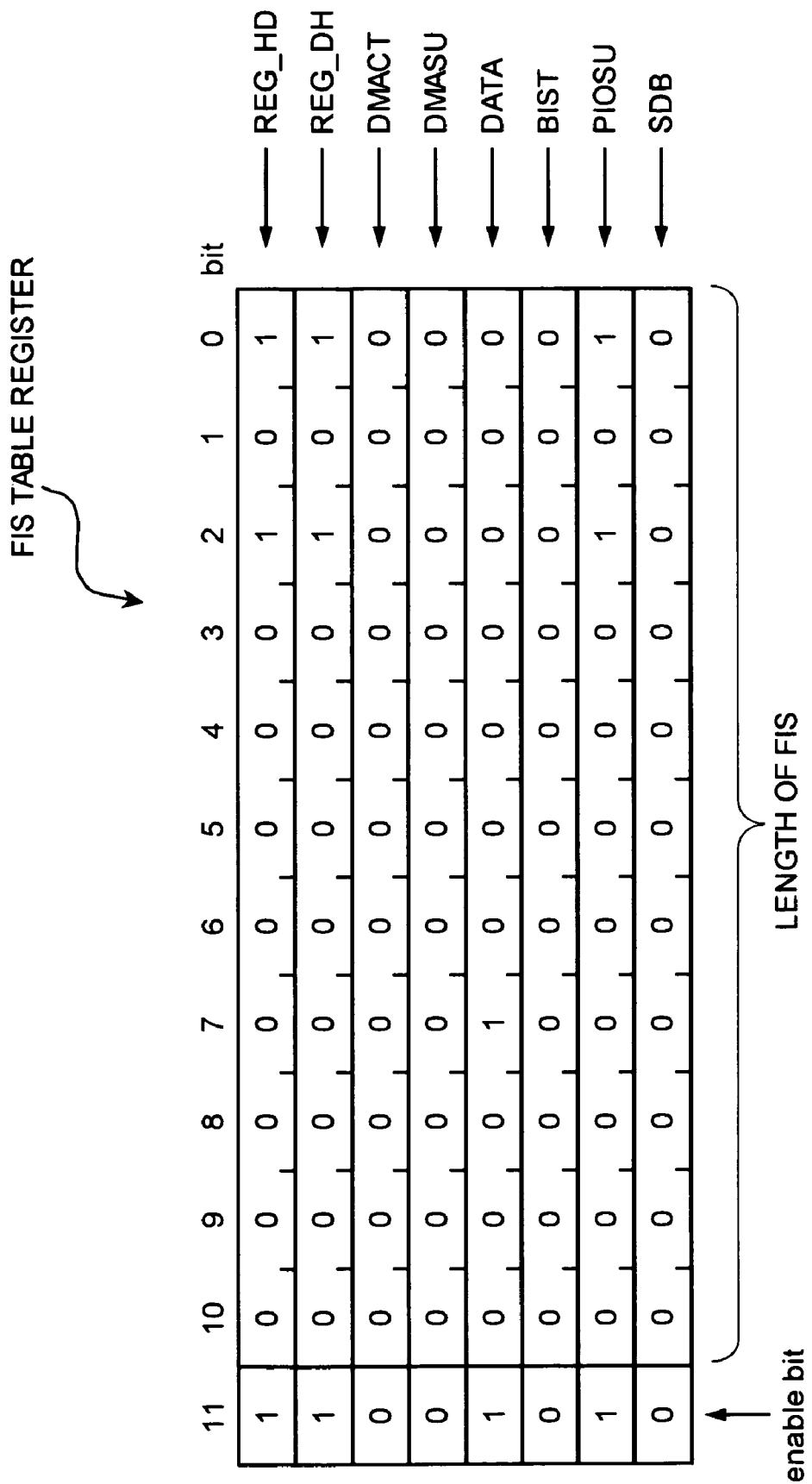
FIG. 2 is a diagram of an example of information for a type and a length of FIS registered in a FIS table register.

FIG. 2 is a diagram of an example of information for a type and a length of FIS to be registered in the FIS table register. The FIS table register is set when a command "PIO WRITE" is transmitted from the host computer. The command "PIO WRITE" is used to write data in a programmed input/output (PIO) format. A central processing unit (CPU) of the host computer controls transfer of data from the main memory of the host computer to the hard disk control unit.

As shown in FIG. 2, "REG_HD", "REG_DH", "DMACT", "DMASU", "DATA", "BIST", "PIOSU", and "SDB" are registered in the FIS table register as types of FIS that are probable of transmission when a command is executed.

These types of FIS are in a one-to-one correspondence with those as follows defined in the serial ATA standard, "Register—Host to Device FIS", "Register—Device to Host FIS", "DMA Activate—Device to Host FIS", "DMA Setup—Device to Host FIS or Host to Device FIS", "Data—Host to Device FIS or Device to Host FIS", "BIST Activate FIS", "PIO Setup—Device to Host FIS", and "Set Device Bit—Device to Host FIS".

Allocated to the registered FISs are areas of 12 bits (bit 0 to bit 11). Information for the length of FIS is registered in the first 11 bits (bit 0 to bit 10) in binary, and information, as to whether FIS is receivable when the command "PIO WRITE" is to be executed, is registered in the last 1 bit (bit 11, enable bit).

In FIS "REG_HD", as bit 11 is "1", it is understood that the FIS is predicted to be received or is receivable when the command "PIO WRITE" is executed. Further, in the FIS "REG_HD", as bit 0 and bit 2 are "1", it is understood that the data length of the FIS is $1 \times 2^2 + 1 = 5$ Dword, that is, 160 bits.

Referring back to FIG. 1, the next receivable FIS registering unit 131 registers information for the type of FIS which is receivable next following the FIS already received by the FIS receiver 11, in a receivable FIS register (not shown) of the next receivable FIS registering unit 131 during execution of a command.

The order of receiving FISs is determined for each command. For example, if the command "PIO WRITE" is to be executed, the order of receiving FISs is "REG_HD", "PIOSU", "DATA", "PIOSU", "DATA", . . . and "REG_DH". It is noted that reception is repeated between "DATA" and "REG_DH" by the number of sectors that are continuously processed, and that information for the number of sectors is included in the header of FIS as sector count.

Figure 3:
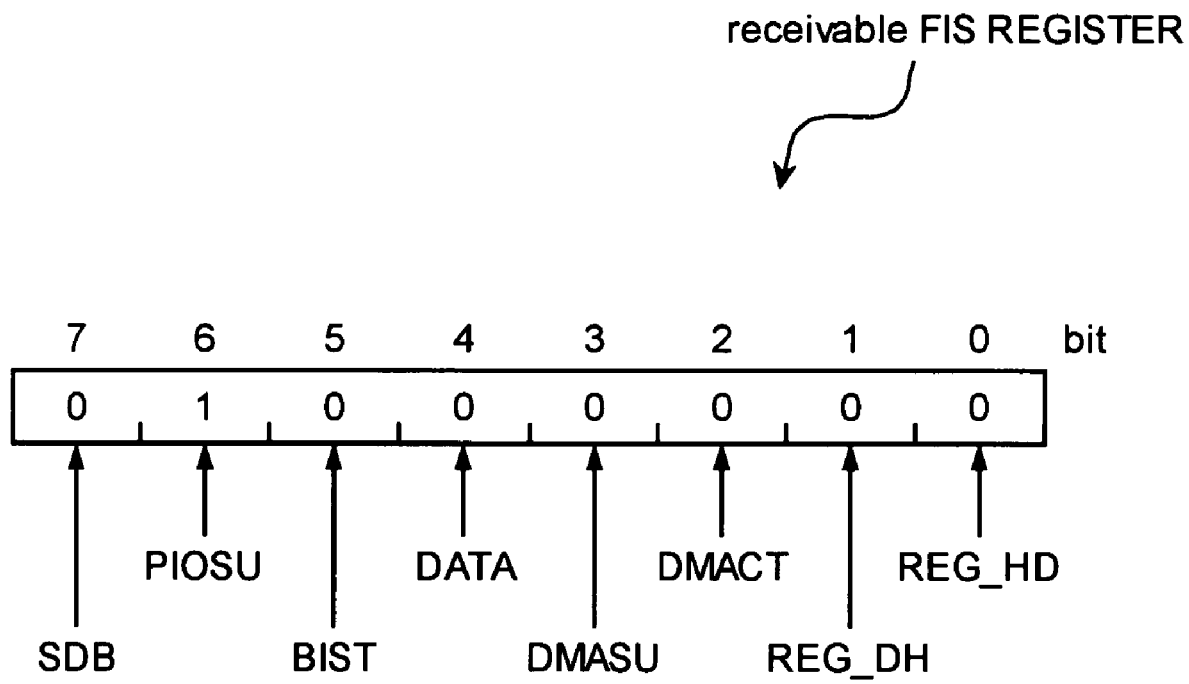
FIG. 3 is a diagram of an example of information for a type of FIS that is received next and registered in a receivable FIS register.

FIG. 3 is a diagram of an example of information for a type of FIS that is receivable next and registered in the receivable FIS register. An 8-bit (bit 0 to bit 7) area is allocated to the receivable FIS register, and each type of the FISs shown in FIG. 2 corresponds to each of the bits.

Setting any of the bits to "1" allows a type of FIS, which is receivable next, to be registered. In the example of FIG. 3, as bit 6 is "1", it is understood that FIS "PIOSU" is receivable next.

Referring back to FIG. 1, if a reception error as explained below occurs, the reception error handling unit 14 executes a reception error handling routine according to the reception error. The reception error is such that the information for the attribute of the packet acquired by the FIS attribute acquiring unit 12 does not correspond to the information for the attribute of the packet registered by the FIS attribute registering unit 13.

The reception error handling unit 14 includes a FIS type comparator 140, a FIS length comparator 141, a hard disk (HD) status controller 142, a log recording unit 143, an interrupt handler 144, and a cyclic redundancy check (CRC) error detector 145.

The FIS type comparator 140 compares the information for the type of FIS acquired by the FIS attribute acquiring unit 12 with the information for the type of FIS which has been registered in the FIS table register by the FIS table registering unit 130 and which is receivable, and determines whether the two types of FISs coincide with each other. If they do not coincide with each other, the FIS type comparator 140 transmits a reception error signal of "undefined error" to the HD status controller 142.

The FIS type comparator 140 compares the information for the type of FIS acquired by the FIS attribute acquiring unit 12 with the information for the type of FIS which has been registered in the receivable FIS table register by the next receivable FIS registering unit 131, and determines whether the two types of FISs coincide with each other. If the two types coincide with each other, the FIS type comparator 140 transmits a reception error signal of "unexpected error" to the HD status controller 142.

The FIS length comparator 141 compares the information for the length of FIS acquired by the FIS attribute acquiring unit 12 with the information for the length of FIS which has been registered in the FIS table register by the FIS table registering unit 130 and which is receivable, and determines whether the two lengths of FISs coincide with each other. If the two lengths do not coincide with each other, the FIS length comparator 141 transmits a reception error signal of "length error" to the HD status controller 142.

The HD status controller 142 sets the status of the hard disk drive from an operating status to an idle status, or from an idle status to an operating status. When receiving the reception error signal of "undefined error" or "length error", the HD status controller 142 sets the status of the hard disk drive to the idle status. When receiving the reception error signal of "unexpected error", the HD status controller 142 maintains the status thereof at the time of its reception.

If a reception error such as "undefined error", "length error", or "unexpected error" occurs, the log recording unit 143 records information for the reception error in a log register (not shown) of the log recording unit 143.

Figure 4:
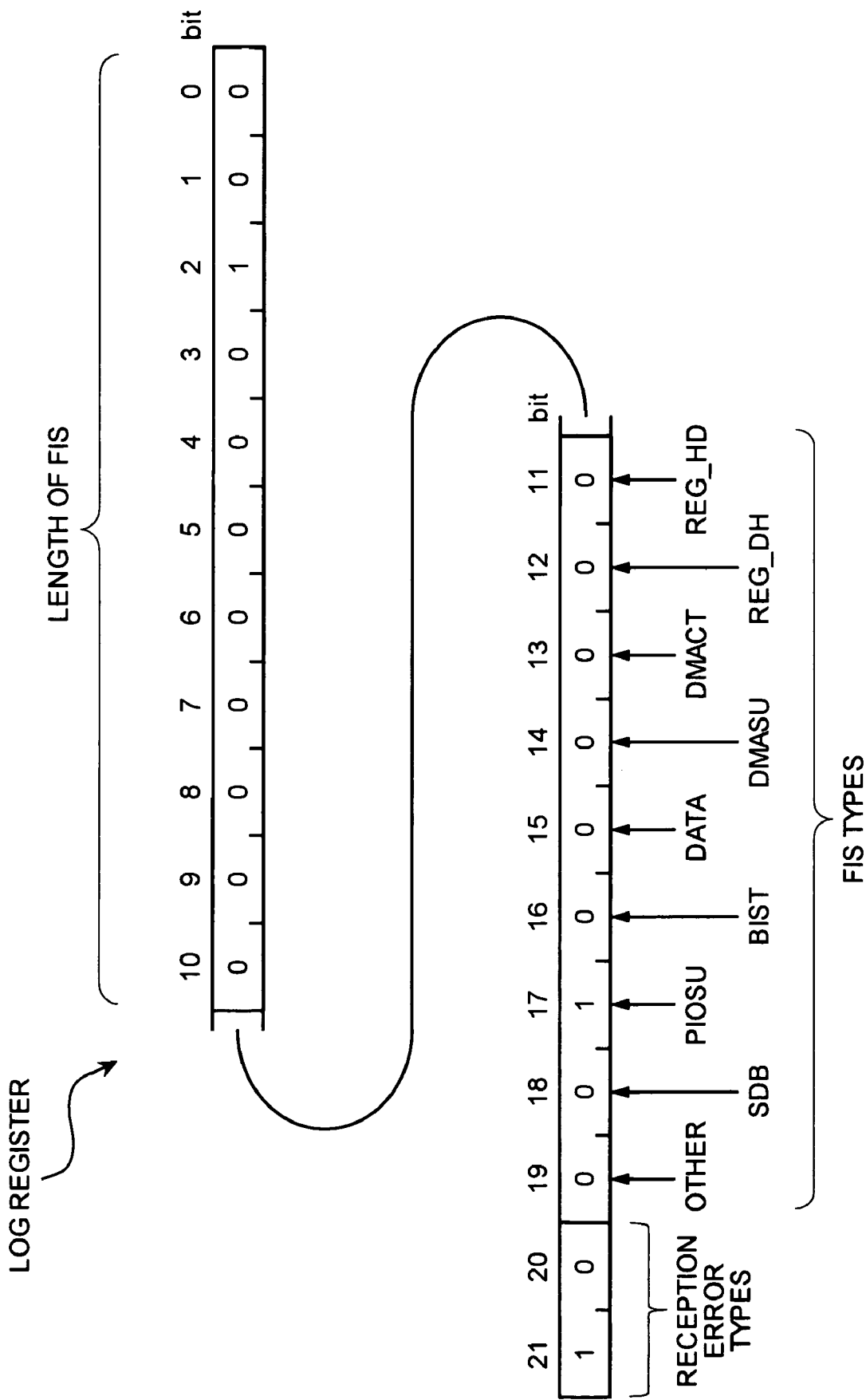
FIG. 4 is a diagram of an example of reception error information to be registered in a log register.

FIG. 4 is a diagram of an example of reception error information to be registered in the log register. A 22-bit (bit 0 to bit 21) area is allocated to the log register. The first 11 bits (bit 0 to bit 10) store the information for the lengths of FIS received by the FIS receiver 11, the next 9 bits (bit 11 to bit 19) store the information for the types of the FIS received by the FIS receiver 11, and the last 2 bits (bit 20 and bit 21) store the information for the types of reception error.

For example, the log recording unit 143 allocates a bit string of "01" to "undefined error", a bit string of "10" to "length error", and a bit string of "11" to "unexpected error", and registers a bit string corresponding to a reception error that has occurred, in bit 20 and bit 21.

It is understood from the example of FIG. 4 that the length of the received FIS is $2^2=4$ Dword, the type thereof is "PIOSU", and the type of reception error is "length error" (because FIS "PIOSU" should be 5 Dword.) The host computer can check detailed information for the reception error by referring to the value of the log register.

Referring back to FIG. 1, the interrupt handler 144 performs processing for transmitting an interrupt signal from the hard disk control unit to the host computer. The interrupt handler 144 not only transmits the interrupt signal but also executes a reception error handling routine according to a reception error that has occurred.

More specifically, if "undefined error" or "length error" has occurred, the interrupt handler 144 records reception error information for the "undefined error" or "length error" in an interrupt register (not shown) of the interrupt handler 144, resets the RFIFO memory of the FIS receiver 11, and abandons the FIS stored on the RFIFO memory.

If "unexpected error" has occurred, the interrupt handler 144 records reception error information for "unexpected error" in the interrupt register, maintains the storage of the FIS stored on the RFIFO memory of the FIS receiver 11, and issues a retry signal indicating a request for retransmission of the FIS to the host computer.

FIG. 5 is a diagram of an example of reception error information to be registered in the interrupt register. A 3-bit (bit 0 to bit 2) area is allocated to the interrupt register, and each bit area corresponds to "undefined error", "length error", or "unexpected error". The interrupt handler 144 sets a value of the interrupt register corresponding to reception error that has occurred to "1", and notifies the host computer of occurrence of the reception error. The example of FIG. 5 indicates occurrence of "length error".

The CRC error detector 145 detects whether a cyclic redundancy check (CRC) error has occurred in the FIS stored on the RFIFO memory of the FIS receiver 11 when a reception error of "undefined error", "length error", or "unexpected error" has not occurred.

If the CRC error is detected, the CRC error detector 145 abandons the FIS stored on the RFIFO memory and executes processing for the retry such that retransmission of FIS is requested to the host computer. If it is not detected, the CRC error detector 145 requests the FIS receiver 11 to transfer the FIS stored on the RFIFO memory to the command executing unit 15.

If it is determined that a reception error of FIS has not occurred by the FIS type comparator 140, the FIS length comparator 141, and by the CRC error detector 145, then the command executing unit 15 acquires information for the FIS received by the FIS receiver 11 and executes the command received by the command receiver 10.

The procedure for receiving FIS performed by the hard disk control unit is explained below with reference to flowcharts of FIGS. 6A to 6C.

Figure 6A:
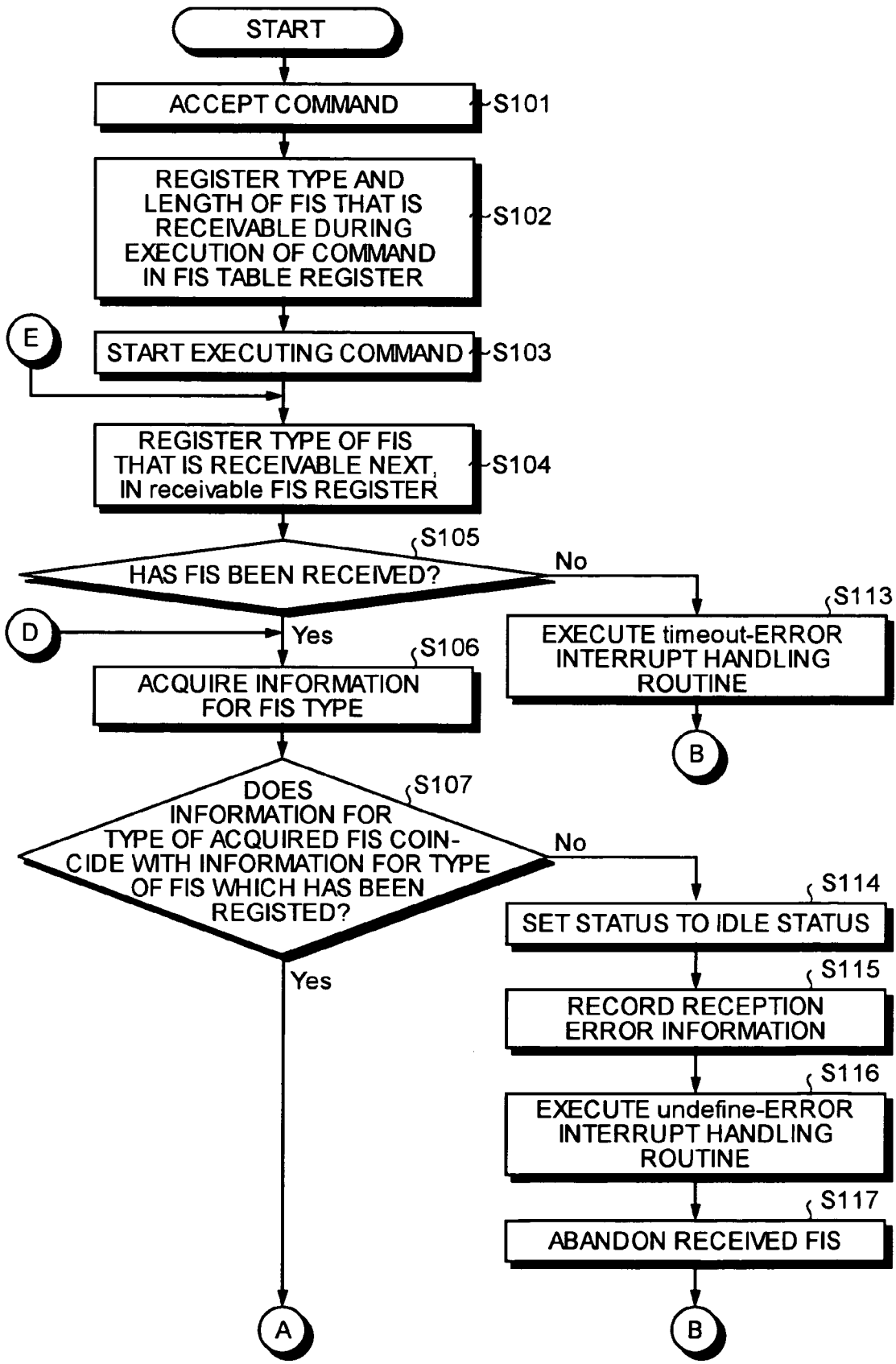

As shown in FIG. 6A, the command receiver 10 accepts a command transmitted from the host computer (step S101). The FIS table registering unit 130 registers information for a type and a length of FIS that is receivable during execution of the accepted command (step S102).

The command executing unit 15 starts execution of the command (step S103), and the next receivable FIS registering unit 131 registers the information for FIS that is receivable next, in the receivable FIS register (step S104).

The FIS receiver 11 determines whether FIS has been received (step S105), and if the FIS has been received (step S105, Yes), the FIS attribute acquiring unit 12 acquires information for the type of FIS from the header of the FIS (step S106).

If the FIS has not been received for a predetermined period (step S105, No), the FIS receiver 11 executes a timeout-error interrupt handling routine such that execution of the command is halted (step S113), and terminates the reception of the FIS as it is.

After the determination on the type of FIS at step S106 is ended, the FIS type comparator 140 determines whether the information for the type of the acquired FIS coincides with the information for the type of the FIS which has been registered in the FIS table register and which is receivable (step S107).

If both of the types of the FISs coincide with each other (step S107, Yes), as shown in FIG. 6B, the FIS attribute acquiring unit 12 acquires information for the length of the FIS (step S108). If they do not coincide with each other (step S107, No), as shown in FIG. 6A, the HD status controller 142 sets the status of the hard disk drive to the idle status (step S114), and the log recording unit 143 records reception error information in the log register (step S115).

The interrupt handler 144 executes an undefined-error interrupt handling routine such that the reception error information for "undefined error" is recorded in the interrupt register (step S116). The interrupt handler 144 then transmits a signal indicating that the FIS is abandoned, to the FIS receiver 11, abandons the received FIS (step S117), and terminates the reception of the FIS as it is.

As shown in FIG. 6B, after the detection on the length of the FIS is ended at step S108, the FIS length comparator 141 determines whether the acquired information for the length of the FIS is coincident with the information for the length of the FIS which has been registered in the FIS table register and which is receivable (step S109).

If both of the lengths of the FISs do not coincide with each other (step S109, No), the HD status controller 142 sets the status of the hard disk drive to the idle status (step S118), and the log recording unit 143 records the reception error information in the log register (step S119).

The interrupt handler 144 executes a length-error interrupt handling routine such that the reception error information for "length error" is recorded in the interrupt register (step S120). The interrupt handler 144 then transmits a signal indicating that the FIS is abandoned, to the FIS receiver 11, abandons the received FIS (step S121), and terminates the reception of the FIS as it is.

At step S109, if the lengths of the FISs coincide with each other (step S109, Yes), then the FIS type comparator 140 determines whether the information for the type of the FIS acquired at step S106 coincides with the information for the type of the FIS that has been registered in the receivable FIS register (step S110).

If both of the types of the FISs do not coincide with each other (step S110, No), the log recording unit 143 records reception error information in the log register (step S122). The interrupt handler 144 executes an unexpected-error interrupt handling routine such that the reception error information for "unexpected error" is recorded in the interrupt register (step S123), and performs the processing for the retry such that retransmission of FIS is requested to the host computer (step S124).

The FIS receiver 11 determines whether the FIS has been received again after the retry (step S125). If the FIS has been received again (step S125, Yes), the process proceeds to step S106, and the processing at step S106 and thereafter is executed.

If the FIS has not been received for a predetermined period (step S125, No), the FIS receiver 11 executes a timeout-error interrupt handling routine such that execution of the command is halted (step S126), and terminates the reception of the FIS as it is.

Figure 6C:
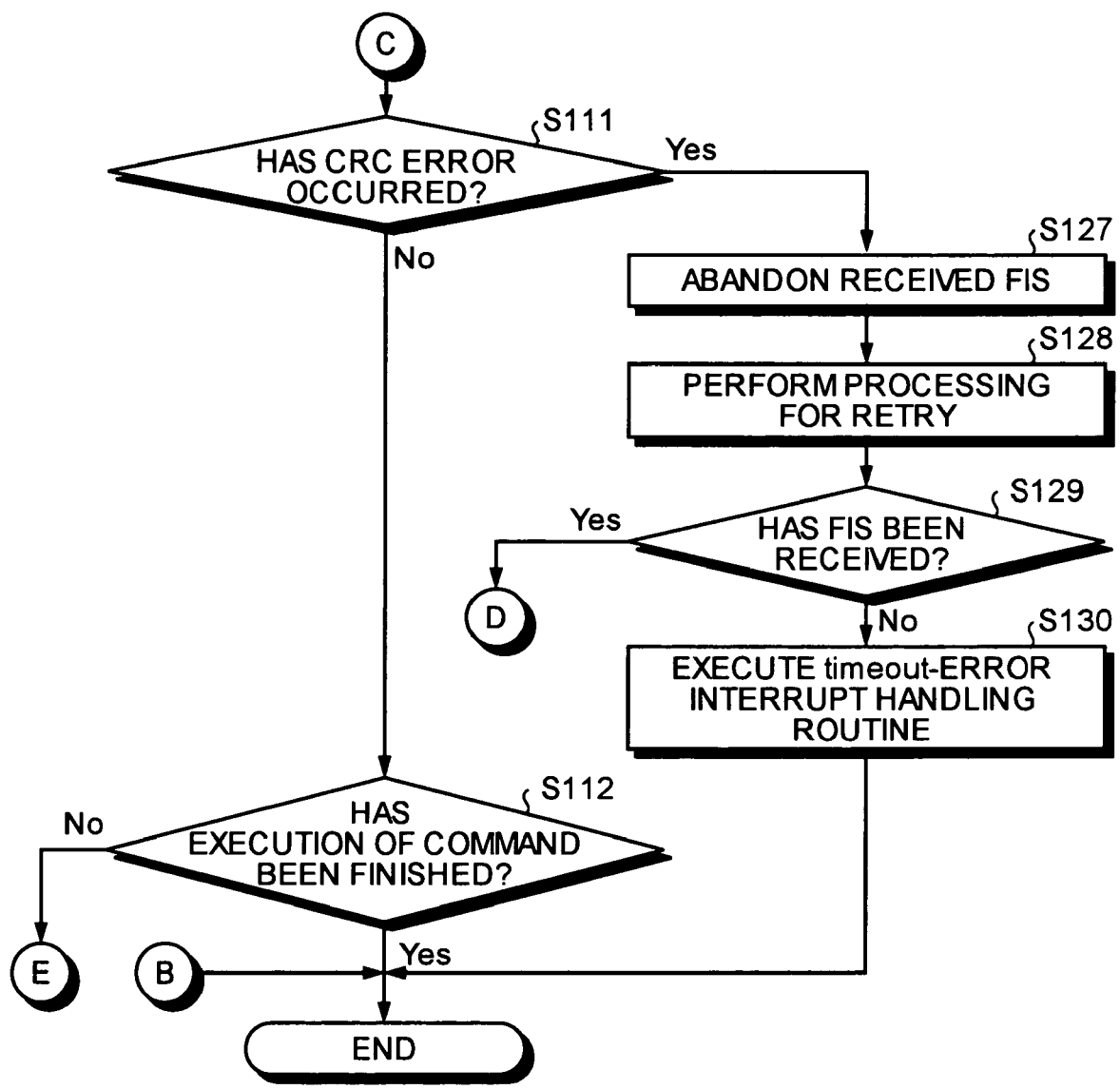

At step S110, if both of the types of the FISs coincide with each other (step S110, Yes), as shown in FIG. 6C, the CRC error detector 145 detects whether a CRC error has occurred (step S111).

If the CRC error has occurred (step S111, Yes), the CRC error detector 145 transmits a signal indicating that the FIS is abandoned to the FIS receiver 11, abandons the received FIS (step S127), and performs the processing for the retry such that retransmission of FIS is requested to the host computer (step S128).

The FIS receiver 11 determines whether the FIS has been received again after the retry (step S129). If the FIS has been received again (step S129, Yes), the process proceeds to step S106, and the processing at step S106 and thereafter is executed.

If the FIS has not been received for a predetermined period (step S129, No), the FIS receiver 11 executes a timeout-error interrupt handling routine such that execution of the command is halted (step S130), and terminates the reception of FIS as it is.

At step S111, if the CRC error has not occurred (step S111, No), the command executing unit 15 determines whether the execution of command has been finished (step S112). If the execution has not been finished (step S112, No), the process proceeds to step S104, and processing at step S104 and thereafter is executed. If it has been finished (step S112, Yes), the reception of the FIS is ended.

As explained above, in the embodiment, the FIS attribute registering unit 13 registers the information for an attribute of FIS which is receivable correspondingly to the command, and the FIS attribute acquiring unit 12 acquires information for an attribute of the received FIS. If a reception error as explained below has occurred, the reception error handling unit 14 executes a predetermined reception error handing routine according to the type of the reception error. More specifically, the reception error is such that the acquired information does not correspond to the registered information. Therefore, the error handling related to reception of FIS can be speedily and efficiently executed.

The embodiment of the present invention has been explained so far, but various embodiments may be executed within a technological range described in the scope of claims that is explained later.

For example, in the embodiment, the case where the hard disk control unit based on the serial ATA standard executes a reception error handling routine has been explained, but the present invention is not limited to the case. The present invention is also applicable to hard disk control units based on another standard in which an attribute of a received packet is predicted.

In the embodiment, the case where the hard disk control unit executes a reception error handling routine has been explained, but the present invention is not limited to the case. The present invention is also applicable to another storage control apparatuses such as a flexible disk drive, a magneto optical disk (MO) drive, a compact disk recordable (CD-R) drive, and a magnetic tape device.

Of the processes explained in the embodiment, the whole or a part of the processes that is executed automatically may be executed manually, or the whole or a part of the processes that is executed manually may also be executed automatically using a known method. In addition, the information including the processing procedure, the control procedure, specific names, various data and parameters in the specification and the drawings can be arbitrarily changed unless otherwise specified.

Since the components in the figures are functionally and conceptually configured, they are not necessarily configured physically as shown in the figures. In other words, specific configurations obtained by distributing or integrating the components are not limited to those as shown in the figures. Therefore, the whole or a part of the configurations can be functionally or physically distributed or integrated in arbitrary units according to various loads or their use patterns.

Furthermore, the whole or a part of the processing functions is realized as hardware using wired logic, or is realized by a CPU and a program that is analyzed and executed by the CPU.

For example, when the reception error of "unexpected error" has occurred, firmware introduced to the hard disk drive may execute the reception error handling routine such as a retry to the unexpected error. The reception error handling routine executed by the firmware is not limited to that explained in the embodiment, that is, various handling routines may be executed. As explained above, by dividing the process into one executed by the hardware and another one executed by the firmware, the process amount of the hardware can be reduced, thus reducing manufacturing cost of the hardware.

According to the present invention, information for an attribute of a packet that is receivable correspondingly to the command is registered, and information for an attribute of the received packet is acquired. If a reception error has occurred in such a manner that the acquired information does not correspond to the registered information, a predetermined reception error handling routine is executed according to a type of the reception error. Therefore, it is possible to speedily and efficiently execute error handling related to reception of the packet.

Moreover, the information for the attribute of the packet includes information for a type of the packet. If a reception error has occurred in such a manner that the acquired information for the type of the packet does not correspond to the registered information for the attribute of the packet, the received packet is abandoned. Therefore, it is possible to detect an unnecessary retry and execute appropriate error handling speedily and efficiently.

Furthermore, the information for the attribute of the packet includes information for a length of the packet. If a reception error has occurred in such a manner that the acquired information for the length of the packet does not correspond to the registered information for the length of the packet, the received packet is abandoned. Therefore, it is possible to detect an unnecessary retry and execute appropriate error handling speedily and efficiently.

Moreover, the information for the attribute of the packet includes information for an order of receiving the packets. If a reception error has occurred in such a manner that the acquired information for the order of receiving the packets does not correspond to the registered information for the order of receiving the packets, the received packet is held and a predetermined reception error handling routine is executed. Therefore, it is possible to detect a possible retry and execute appropriate error handling speedily and efficiently.

Furthermore, a part of the reception error handling routine is executed as a firmware process executed by a microcomputer. Therefore, by dividing the process into one executed by the hardware and another one executed by the firmware, it is possible to reduce the process amount executed by the hardware, reduce manufacturing costs, and execute appropriate error handling speedily and efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A serial advanced technology attachment (SATA) interface control apparatus that receives a SATA frame including data required to execute a predetermined command and that executes the command based on the data in the SATA frame received, comprising:

an attribute registering unit to register information about an attribute of SATA frames that are receivable corresponding to a command;

an attribute acquiring unit that acquires information about an attribute of the SATA frame received; and a reception error handling unit to determine, upon occurrence of a reception error that there is no information in the attribute registering unit corresponding to the information acquired by the attribute acquiring unit, whether the reception error requires a retry for requiring retransmission of the SATA frame, and to perform the retry when the reception error requires the retry.

2. The SATA interface control apparatus according to claim 1, wherein the information about the attribute of the SATA frame includes information about a type of the SATA frame, and the reception error handling unit abandons the SATA frame received upon occurrence of a reception error that there is no information about the type of the SATA frame in the attribute registering unit corresponding to the information about the type of the SATA frame acquired by the attribute acquiring unit.

3. The SATA interface control apparatus according to claim 1, wherein the information about the attribute of the SATA frame includes information about a length of the SATA frame, and the reception error handling unit abandons the SATA frame received upon occurrence of a reception error that there is no information about the length of the SATA frame in the attribute registering unit corresponding to the information about the length of the SATA frame acquired by the attribute acquiring unit.

4. The SATA interface control apparatus according to claim 1, wherein the information about the attribute of the SATA frame includes information about an order of receiving the SATA frame, and the reception error handling unit abandons the SATA frame received upon occurrence of a reception error that there is no information about the order of receiving of the SATA frame in the attribute registering unit corresponding to the information about the order of receiving of the SATA frame acquired by the attribute acquiring unit.

5. The SATA interface control apparatus according to claim 1, wherein the reception error handling unit performs the retry as a firmware process executed by a microcomputer.

6. A storage apparatus that receives a serial advanced technology attachment (SATA) frame including data required to execute a predetermined command and that executes the command based on the data in the SATA frame received, comprising:

an attribute registering unit to register information about an attribute of SATA frames that are receivable corresponding to a command;

an attribute acquiring unit that acquires information about an attribute of the SATA frame received; and a reception error handling unit to determine, upon occurrence of a reception error that there is no information in the attribute registering unit corresponding to the information acquired by the attribute acquiring unit, whether the reception error requires a retry for requiring retransmission of the SATA frame, and to perform the retry when the reception error requires the retry.

7. The storage apparatus according to claim 6, wherein the information about the attribute of the SATA frame includes information about a type of the SATA frame, and the reception error handling unit abandons the SATA frame received upon occurrence of a reception error that there is no information about the type of the SATA frame in the attribute registering unit corresponding to the information about the type of the SATA frame acquired by the attribute acquiring unit.

8. The storage apparatus according to claim 6, wherein
the information about the attribute of the SATA frame includes information about a length of the SATA frame, and
the reception error handling unit abandons the SATA frame received upon occurrence of a reception error that there is no information about the length of the SATA frame in the attribute registering unit corresponding to the information about the length of the SATA frame acquired by the attribute acquiring unit.

9. The storage apparatus according to claim 6, wherein
the information about the attribute of the SATA frame includes information about an order of receiving the SATA frame, and
the reception error handling unit abandons the SATA frame received upon occurrence of a reception error that there is no information about the order of receiving of the SATA frame in the attribute registering unit corresponding to the information about the order of receiving of the SATA frame acquired by the attribute acquiring unit.

10. The storage apparatus according to claim 6, wherein the reception error handling unit performs the retry as a firmware process executed by a microcomputer.

11. A method of receiving a serial advanced technology attachment (SATA) frame including data required to execute a predetermined command and executing the command based on the data in the SATA frame received, comprising:
registering information about an attribute of SATA frames that are receivable corresponding to a command in an attribute registering unit;
acquiring information about an attribute of the SATA frame received; and
determining, upon occurrence of a reception error that there is no information in the attribute registering unit corresponding to the information acquired whether the reception error requires a retry for requiring retransmission of the SATA frame; and
performing the retry when the reception error requires the retry.

12. The method according to claim 11, wherein
the information about the attribute of the SATA frame includes information about a type of the SATA frame, and
the executing includes abandoning the SATA frame received upon occurrence of a reception error that there is no information about the type of the SATA frame in the attribute registering unit corresponding to the information about the type of the SATA frame acquired at the acquiring.

13. The method according to claim 11, wherein
the information about the attribute of the SATA frame includes information about a length of the SATA frame, and
the executing includes abandoning the SATA frame received upon occurrence of a reception error that there is no information about the length of the SATA frame in the attribute registering unit corresponding to the information about the length of the SATA frame acquired at the acquiring.

14. The method according to claim 11, wherein
the information about the attribute of the SATA frame includes information about an order of receiving the SATA frame, and
the executing includes abandoning the SATA frame received upon occurrence of a reception error that there is no information about the order of receiving of the SATA frame in the attribute registering unit corresponding to the information about the order of receiving of the SATA frame acquired at the acquiring.

15. The method according to claim 11, wherein the executing includes executing the retry as a firmware process executed by a microcomputer.

16. A system for receiving a serial advanced technology attachment (SATA) frame including data required to execute a predetermined command and executing the command based on the data in the SATA frame received, the system comprising:
a processor; and
a memory storing computerreadable instructions, execution of the instructions by the processor configuring the system to include,
registering information about an attribute of SATA frames that are receivable corresponding to a command in an attribute registering unit;
acquiring information about an attribute of the SATA frame received; and
determining, upon occurrence of a reception error that there is no information in the attribute registering unit corresponding to the information acquired at the acquiring, whether the reception error requires a retry for requiring retransmission of the SATA frame; and
performing the retry when the reception error requires the retry.

17. The system according to claim 16, wherein
the information about the attribute of the SATA frame includes information about a type of the SATA frame, and
the executing includes abandoning the SATA frame received upon occurrence of a reception error that there is no information about the type of the SATA frame in the attribute registering unit corresponding to the information about the type of the SATA frame acquired at the acquiring.

18. The system according to claim 16, wherein
the information about the attribute of the SATA frame includes information about a length of the SATA frame, and
the executing includes abandoning the SATA frame received upon occurrence of a reception error that there is no information about the length of the SATA frame in the attribute registering unit corresponding to the information about the length of the SATA frame acquired at the acquiring.

19. The system according to claim 16, wherein
the information about the attribute of the SATA frame includes information about an order of receiving the SATA frame, and
the executing includes abandoning the SATA frame received upon occurrence of a reception error that there is no information about the order of receiving of the SATA frame in the attribute registering unit corresponding to the information about the order of receiving of the SATA frame acquired at the acquiring.

20. The system according to claim 16, wherein the executing includes executing the retry as a firmware process executed by a microcomputer.

* * * * *

UNITED STATES PATENT AND TRADEMARK OFFICE
CERTIFICATE OF CORRECTION

| | | |
|---|---|---|
| PATENT NO. | : 7,664,042 B2 | Page 1 of 1 |
| APPLICATION NO. | : 10/779401 | |
| DATED | : February 16, 2010 | |
| INVENTOR(S) | : Utsunomiya et al. | |

It is certified that error appears in the above-identified patent and that said Letters Patent is hereby corrected as shown below:

On the Title Page:

(54) TITLE      Delete the title and replace it with the following:

--STORAGE CONTROL APPARATUS, STORAGE APPARATUS, STORAGE CONTROL METHOD, AND SYSTEM FOR EXECUTING A COMMAND BASED ON DATA IN RECEIVED PACKET--.

In the Claims:

Claim 16
Col. 12, Line 16      Delete "computerreadable" and insert --computer-readable-- in its place.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,664,042 B2  Page 1 of 1
APPLICATION NO. : 10/779401
DATED : February 16, 2010
INVENTOR(S) : Utsunomiya et al.

It is certified that error appears in the above-identified patent and that said Letters Patent is hereby corrected as shown below:

On the Title Page, Item (54) and at Column 1, lines 1-6:

TITLE    Delete the title and replace it with the following:

--STORAGE CONTROL APPARATUS, STORAGE APPARATUS, STORAGE CONTROL METHOD, AND SYSTEM FOR EXECUTING A COMMAND BASED ON DATA IN RECEIVED PACKET--.

In the Claims:

Claim 16
Col. 12, Line 16    Delete "computerreadable" and insert --computer-readable-- in its place.

This certificate supersedes the Certificate of Correction issued September 28, 2010.

Signed and Sealed this

Ninth Day of November, 2010

David J. Kappos
*Director of the United States Patent and Trademark Office*